(12) United States Patent
Kim

(10) Patent No.: US 6,547,892 B2
(45) Date of Patent: Apr. 15, 2003

(54) FLUX CORED WIRE WITH SUPERIOR CRACKING RESISTANT PROPERTY FOR WELDING FERRITE STAINLESS STEEL

(75) Inventor: Seung-Gook Kim, Kyungsangbook-do (KR)

(73) Assignee: Hyundai Welding Co. Ltd., Seoul (KR)

( * ) Notice: Subject to any disclaimer, the term of this patent is extended or adjusted under 35 U.S.C. 154(b) by 0 days.

(21) Appl. No.: 09/808,930

(22) Filed: Mar. 15, 2001

(65) Prior Publication Data

US 2001/0030003 A1 Oct. 18, 2001

(30) Foreign Application Priority Data

Mar. 20, 2000 (KR) .......................... 2000-13939

(51) Int. Cl.[7] .................. C22C 38/26; C22C 38/28
(52) U.S. Cl. .............. 148/325; 219/145.22; 219/146.21
(58) Field of Search ................ 219/137 WM, 219/145.22, 146.21; 420/68, 69, 70; 428/606; 148/325

(56) References Cited

FOREIGN PATENT DOCUMENTS

| JP | 3243296 A2 | 10/1991 | ......... B23K/35/368 |
| JP | 9085491 A2 | 3/1997 | ........... B23K/35/30 |
| JP | 409225680 A * | 9/1997 | ........... C22C/38/00 |

* cited by examiner

Primary Examiner—Deborah Yee
(74) Attorney, Agent, or Firm—Husch & Eppenberger, LLC; Grant D. Kang

(57) ABSTRACT

A flux cored wire for welding a ferrite stainless steel is disclosed.

The flux cored wire includes in weight %, 0.04% or less of C, 0.1~1.0% of Si, 0.1~1.0% of Mn, 0.02% or less of P, 0.02% or less of S, 10~25% of Cr, 0.3~1.5% of Ti+Nb, 0.04% or less of N, 0.04% or less of O, and a balance of Fe and other unavoidable impurities, wherein a value defined by $[(O+N) \times Cr]$ is 0.8 or less. In the flux cored wire for welding the ferrite stainless steel, a superior corrosion resistance and a superior cracking resistance are realized.

2 Claims, 3 Drawing Sheets

Wire Cross Section

FLUX CORED WIRE WITH SUPERIOR CRACKING RESISTANT PROPERTY FOR WELDING FERRITE STAINLESS STEEL

TECHNICAL FIELD

The present invention relates to a flux cored wire for welding a ferrite stainless steel, in which the cracking resistant property and the corrosion resistant property are superior.

BACKGROUND OF THE INVENTION

The components of the automobile gas exhaust system such as muffler and the like are generally made of a ferrite stainless steel. However, when this ferrite stainless steel is welded, the toughness of the welded portion is degraded, and therefore, cracks are liable to be formed. Accordingly, for welding the ferrite stainless steel, efforts have been concentrated on developing a welding wire which is superior to the cracking resistance and to the corrosion resistance.

For this purpose, conventionally solid wires have been used in welding the ferrite stainless steel. However, coming recently, the flux cored wire came to be widely used, because the flux cored wire gives a superior welding workability compared with the solid wire. However, even if the flux cored wire is used to weld the ferrite stainless steel, much slag is generated on the welded portion.

Japanese Patent Hei-5-30557 discloses a technique in which the generation of the slag is decreased during the welding of the ferrite stainless steel. In this technique, a flux cored wire is presented, in which the solution of the problem of the slag generation is aimed by limiting the contents of the slag forming agent, and in which the aggravation of the welding workability is aimed to be overcome by properly controlling the metal ingredients.

Another example of the disclosure of the flux cored wire for welding the ferrite stainless steel is Japanese Patent Application Laid-open No. Hei-9-85491. In this technique, the flux cored wire includes in weight %: 0.07~2.0% of Si, 14.5~17.0% of Cr, 0.01~1.0% of Al, 0.05~2.0% of Ti, 0.02~0.1% of N, 0.005~0.5% of F, and a balance of Fe and other unavoidable impurities. The unavoidable impurities includes: 0.10% or less of C, 0.2% or less of Nb, and 6.0% or less of Mn. This flux cored wire is improved in the oxidation resistant property and in the welding cost curtail.

The above described flux cored wires for welding the ferrite stainless steel are effective in improving the corrosion resistant property and the cracking resistant property to a certain degree. However, it is definitely limitative in attaining to a high corrosion resistant property and a high cracking resistant property.

SUMMARY OF THE INVENTION

The present invention is intended to overcome the above described disadvantages of the conventional techniques.

Therefore it is an object of the present invention to provide a flux cored wire for welding the ferrite stainless steel, in which the corrosion resistant property and the cracking resistant property are superior.

The present inventor carried out much researches and experiments to solve the problem of the cracking resistant property of the deposited metal, which is encountered after welding the ferrite stainless steel. As a result, the present inventor found the following fact. That is, it is important to limit the contents of oxygen and nitrogen among the ingredients of the welding wire, and to decide the total content of them in relation to the content of chrome. Therefore, the present inventor came to propose the present invention. That is, in the flux cored wire for welding the ferrite stainless steel, the contents of oxygen and nitrogen are controlled to the optimum levels, and the value which is defined by $[(O+N) \times Cr]$ is controlled to be 0.8 or less.

Therefore, in achieving the above object, the flux cored wire for welding a ferrite stainless steel according to the present invention includes in weight %: 0.04% or less of C, 0.1~1.0% of Si, 0.1~1.0% of Mn, 0.02% or less of P, 0.02% or less of S, 10~25% of Cr, 0.3~1.5% of Ti+Nb, 0.04% or less of N, 0.04% or less of O, and a balance of Fe and other unavoidable impurities, wherein a value defined by $[(O+N) \times Cr]$ is 0.8 or less.

BRIEF DESCRIPTION OF THE DRAWINGS

The above object and other advantages of the present invention will become more apparent by describing in detail the preferred embodiments of the present invention with reference to the attached drawings, in which:

FIG. 2 is a perspective view showing the method of forming the welding deposition metal for carrying out the cracking resistance test, in which

DESCRIPTION OF THE PREFERRED EMBODIMENTS

Figure 1:
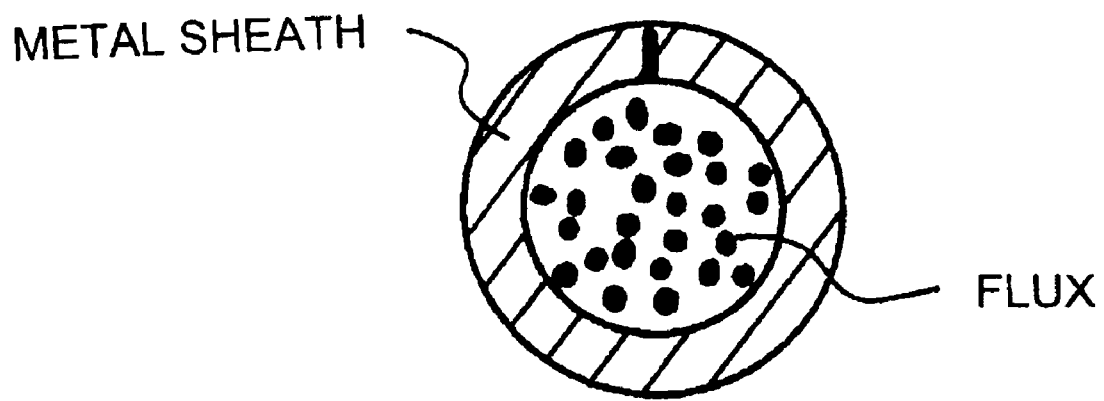
FIG. 1 is a cross sectional view of the flux cored wire for welding the ferrite stainless steel according to the present invention.

The flux cored wire for welding a ferrite stainless steel according to the present invention includes in weight %: 0.04% or less of C, 0.1~1.0% of Si, 0.1~1.0% of Mn, 0.02% or less of P, 0.02% or less of S, 10~25% of Cr, 0.3~1.5% of Ti+Nb, 0.04% or less of N, 0.04% or less of O, and a balance of Fe and other unavoidable impurities, wherein a value defined by $[(O+N) \times Cr]$ is 0.8 or less.

The reason for limiting the ingredients as above will be described below.

If the C content is too high, the martensite is precipitated, and coarse carbides are formed, with the result that the cracking resistant property is aggravated, and that the toughness of the welded portion is lowered. Further, the intragrain corrosion resistibility can be worsened. Accordingly, the C content is limited to 0.04 weight % (to be called % below) or less in the present invention.

The ingredient Si is added as a deoxidizing agent. If its content is too high, then the grain size of the ferrite becomes coarse so as to degrade the toughness, while if its content is too low, the oxidation resistant property is aggravated. Therefore, the content of Si is limited to 0.1~1.0% in the present invention.

The ingredient Mn is added as a deoxidizing agent. It increases the toughness of the weld metal. However, if its content is too high, the elongation would be lowered by increased strength, while if its content is too low, the toughness of the welding metal is also lowered. Therefore, in the present invention, its content is limited to 0.1~1.0%.

As to P and S, if their contents are too high, then grain boundary precipitates such as MnS are formed, with the result that the toughness of the welded portion is lowered. Therefore, by taking into account the cracking resistant property, their contents are limited to 0.02% or less respectively.

The ingredient Mo is an element which improves the heat resistance and the pitting corrosion resistance, and in the present invention, its addition is optional. In the case where it is added, its content should be preferably limited to 3.0% or less. The reason is that if its content is too high, the strength rise will be excessive.

The ingredient Cr is a basic ingredient of the stainless steel. It improves the corrosion resistance and the oxidation resistance of the welded portion, as well as reinforcing the strength. In order to secure the corrosion resistance and the oxidation resistance to a degree same as that of the ferrite stainless steel, Cr is required to be added in an amount of 10% or more. However, if its content exceeds 25%, it is not easy to produce the flux cored wire. For this reason, the Cr content should be preferably limited to 10~25% in the present invention.

The ingredients Ti and Nb prevent the formation of chrome carbides so as to improve the intra-grain corrosion resistance. However, if its content is less than 0.3%, the addition effect is too meager, while if its content exceeds 1.5%, not only the corrosion resistance and the oxidation resistance are lowered by increased slag generation. Accordingly the contents of Ti and Nb should be preferably limited to 0.3~1.5% respectively in the present invention.

The ingredients N and O not only lower the cracking resistance and the toughness of the welding metal, but also aggravate the corrosion resistance, and therefore, their contents should be limited. Thus in the present invention, by taking into account the above described fact, the contents of N and O are limited to 0.04% or less respectively.

Further in the present invention, the value which is defined by $[(O+N) \times Cr]$ is controlled to be 0.8 or less. That is, not only the nitrogen and oxygen contents but also the chrome content are properly controlled. The reason is that if the value exceeds 0.8, then a superior cracking resistance cannot be acquired in the welding metal.

Meanwhile, in the flux cored wire sheathed within a metal sheath for welding the ferrite stainless steel, the metal sheath should be mild steel. Further, the flux is filled at a filling ratio of 10~25% within the metal sheath.

In spite of carrying out the welding by using the flux cored wire of the above composition, a delayed cracking may occur in welding metal owing to the diffusable hydrogen. Accordingly, during the welding, the hydrogen content should be preferably controlled to 2 cc or less per 100 g of the welding metal.

Now the present invention will be described based on an actual example.

EXAMPLE 1

Wires of a 1.2 mm-diameter for welding the ferrite stainless steel were prepared in which the chemical compositions are as shown in Table 1 below, and in which the cross sectional view is as shown in FIG. 1. Then in order to evaluate the cracking resistance, two SS400-chrome-coated and heat-treated rods of 50Φ were welded by using the above described wires.

Figure 2A:
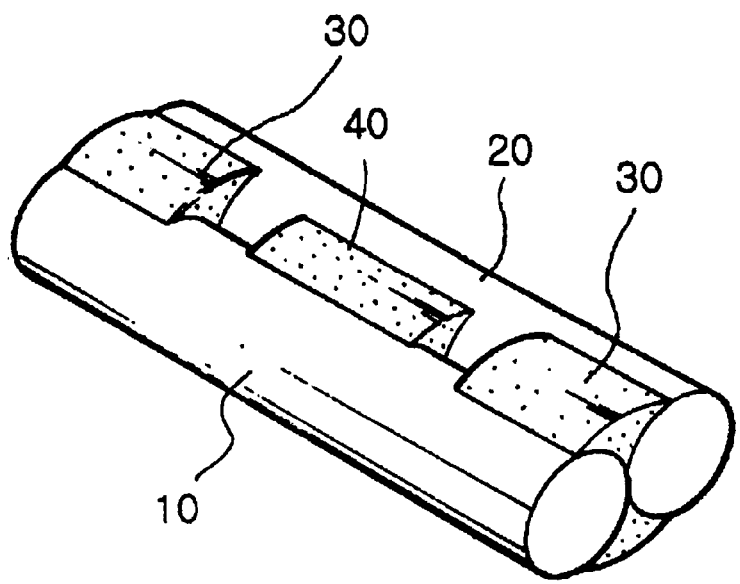
FIG. 2(a) illustrates a method of depositing the welding metal above.
Figure 2B:
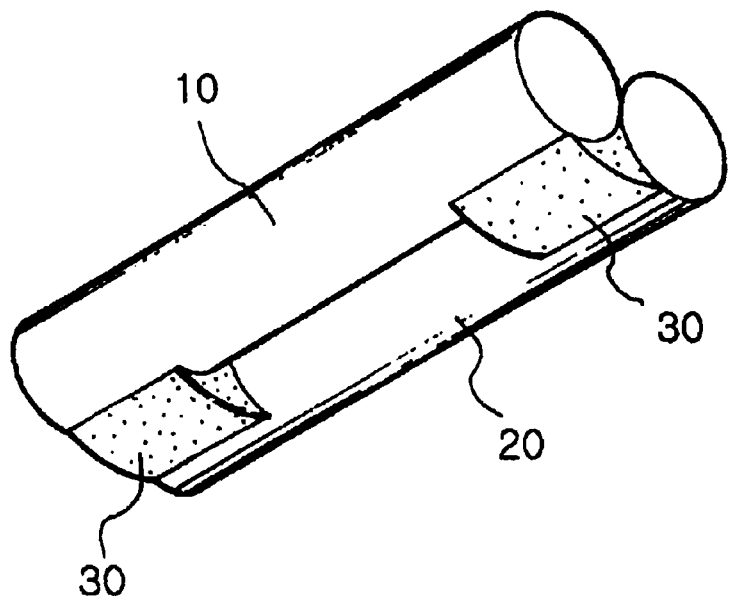
FIG. 2(b) illustrates a method of depositing the welding metal below.

That is, as shown in FIG. 2, first the both ends of the heat treated round rods 10 and 20 were welded to secure the both ends of the round rods 10 and 20, thereby forming welded portions 30. Then a welding was carried out to fix the two heat treated round rods 10 and 20, thereby forming welded portions 40. Under this condition, the specific welding conditions were as shown in Table 2 below.

TABLE 1

| | | Composition of wires (weight %) | | | | | | | | | | | |
|---|---|---|---|---|---|---|---|---|---|---|---|---|---|
| | | C | Si | Mn | P | S | Ti + Nb | Mo | Cr | O | N | Fe | Cracking |
| Inventive Example | 1 | 0.028 | 0.29 | 0.61 | 0.011 | 0.011 | 0.78 | — | 12.2 | 0.0315 | 0.0301 | balance | absent |
| | 2 | 0.025 | 0.31 | 0.58 | 0.015 | 0.012 | 0.84 | — | 12.4 | 0.0301 | 0.0081 | balance | absent |
| | 3 | 0.027 | 0.55 | 0.35 | 0.012 | 0.015 | 0.70 | — | 16.6 | 0.0141 | 0.0277 | balance | absent |
| | 4 | 0.025 | 0.34 | 0.56 | 0.010 | 0.007 | 0.72 | 0.91 | 17.6 | 0.0231 | 0.0199 | balance | absent |
| | 5 | 0.028 | 0.37 | 0.51 | 0.014 | 0.011 | 0.77 | 1.27 | 16.5 | 0.0171 | 0.0078 | balance | absent |
| | 6 | 0.027 | 0.29 | 0.65 | 0.006 | 0.014 | 0.75 | — | 18.5 | 0.0247 | 0.0109 | balance | absent |
| | 7 | 0.028 | 0.30 | 0.65 | 0.007 | 0.014 | 0.70 | — | 18.3 | 0.0182 | 0.0065 | balance | absent |
| | 8 | 0.024 | 0.24 | 0.64 | 0.006 | 0.010 | 0.70 | 2.04 | 21.5 | 0.0109 | 0.0232 | balance | absent |
| | 9 | 0.021 | 0.27 | 0.64 | 0.011 | 0.009 | 0.66 | — | 23.8 | 0.0169 | 0.0104 | balance | absent |
| Comparative Example | 1 | 0.030 | 0.55 | 0.57 | 0.017 | 0.012 | 0.98 | — | 12.3 | 0.0687 | 0.0756 | balance | present |
| | 2 | 0.025 | 0.50 | 0.34 | 0.015 | 0.014 | 0.79 | — | 11.9 | 0.0257 | 0.0954 | balance | present |
| | 3 | 0.028 | 0.19 | 0.79 | 0.015 | 0.011 | 1.05 | — | 12.1 | 0.0661 | 0.0321 | balance | present |
| | 4 | 0.026 | 0.24 | 0.80 | 0.015 | 0.010 | 0.84 | — | 12.8 | 0.0307 | 0.0409 | balance | present |
| | 5 | 0.028 | 0.64 | 0.24 | 0.015 | 0.012 | 0.71 | — | 17.5 | 0.0290 | 0.0219 | balance | present |
| | 6 | 0.032 | 0.35 | 0.56 | 0.008 | 0.016 | 0.58 | 1.41 | 17.8 | 0.0904 | 0.0146 | balance | present |
| | 7 | 0.031 | 0.55 | 0.38 | 0.009 | 0.010 | 0.94 | 0.78 | 17.1 | 0.0337 | 0.0310 | balance | present |
| | 8 | 0.027 | 0.29 | 0.65 | 0.007 | 0.014 | 0.71 | — | 18.7 | 0.0343 | 0.0392 | balance | present |
| | 9 | 0.025 | 0.31 | 0.66 | 0.007 | 0.014 | 0.70 | — | 18.4 | 0.0295 | 0.0180 | balance | present |
| | 10 | 0.031 | 0.51 | 0.31 | 0.012 | 0.008 | 0.64 | — | 21.8 | 0.0410 | 0.0221 | balance | present |
| | 11 | 0.027 | 0.31 | 0.66 | 0.007 | 0.015 | 0.73 | 1.89 | 20.4 | 0.0248 | 0.0210 | balance | present |
| | 12 | 0.020 | 0.51 | 0.58 | 0.012 | 0.015 | 0.65 | — | 23.4 | 0.0191 | 0.0160 | balance | present |

TABLE 2

| Welding machine | Protecting gas | Welding condition | Welding posture | Welding technique |
|---|---|---|---|---|
| SCH 500(A) DC(+) | 100% Ar, gas flow 18 l/min | 240–250 A, 22–23 V/ 30 CPM | Bead on plate | Auto carriage advancing method (welding is started at stationary state, welding is advanced in 3 seconds, stopped at 16 seconds of advancement, and welding is terminated after 3 seconds of stop). |

Figure 3:
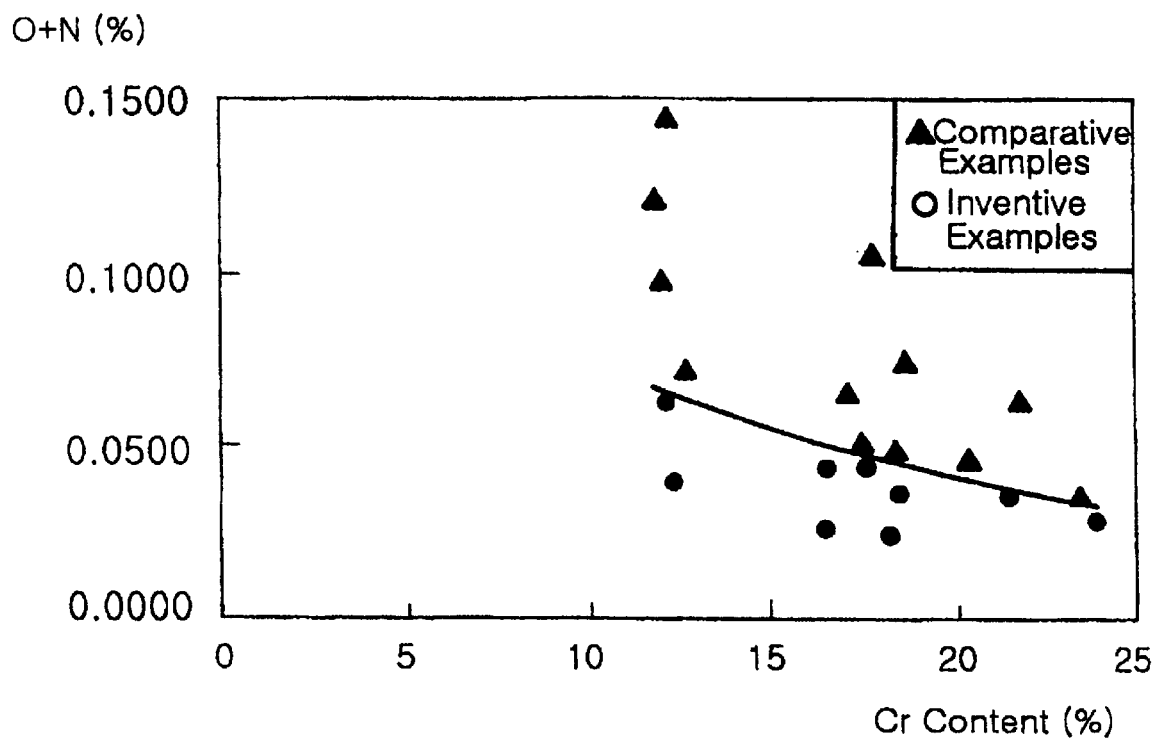
FIG. 3 is a graphical view showing the influence of the ratio of the chrome content to the O+N content on the cracking resistant property.

After elapsing of one week from the completion of the welding, any presence of cracking at the welded portion 40 was checked, and the results are shown in Table 1 above and in FIG. 3.

As shown in Table 1 above, a superior cracking resistance was seen in all the inventive examples 1~9 in which the contents of O and N were optimal, and in which the value defined by [(O+N)×Cr] was 0.8 or less.

In contrast to this, in the case of the comparative examples 1~12 in which the contents of O and N depart from the ranges of the present invention, or in which the value defined by [(O+N)×Cr] exceeded 0.8, there were generated cracking in all of them.

Meanwhile, FIG. 3 is a graphical view showing the influence of the ratio of the chrome content to the O+N content on the cracking resistant property. As shown in this drawing, in view of the Cr content ratio to the (O+N) content, the inventive examples were positively distinguishable from the comparative examples.

According to the present invention as described above, the content of Cr relative to the total content of (O+N) is properly limited, and therefore, a superior corrosion resistance and a superior cracking resistance can be realized in the flux cored wire for welding the ferrite stainless steel.

What is claimed is:

1. A flux cored wire for welding a ferrite stainless steel with the flux filled within a mild steel sheath, consisting essentially of in weight %: 0.04% or less of C, 0.1~1.0% of Si, 0.1~1.0% of Mn, 0.02% or less of P, 0.02% or less of S, 10~25% of Cr, 0.3~1.5% of Ti+Nb, 0.04% or less of N, 0.04% or less of O, and a balance of Fe and other unavoidable impurities, wherein a value defined by [(O+N)×Cr] is 0.8 or less.

2. The flux cored wire as claimed in claim 1, wherein Mo is additionally added in an amount of 3.0% or less.

* * * * *